E. M. WARRENFELTZ.
GRAIN CLEANER.
APPLICATION FILED JUNE 23, 1919.
1,360,335.
Patented Nov. 30, 1920.
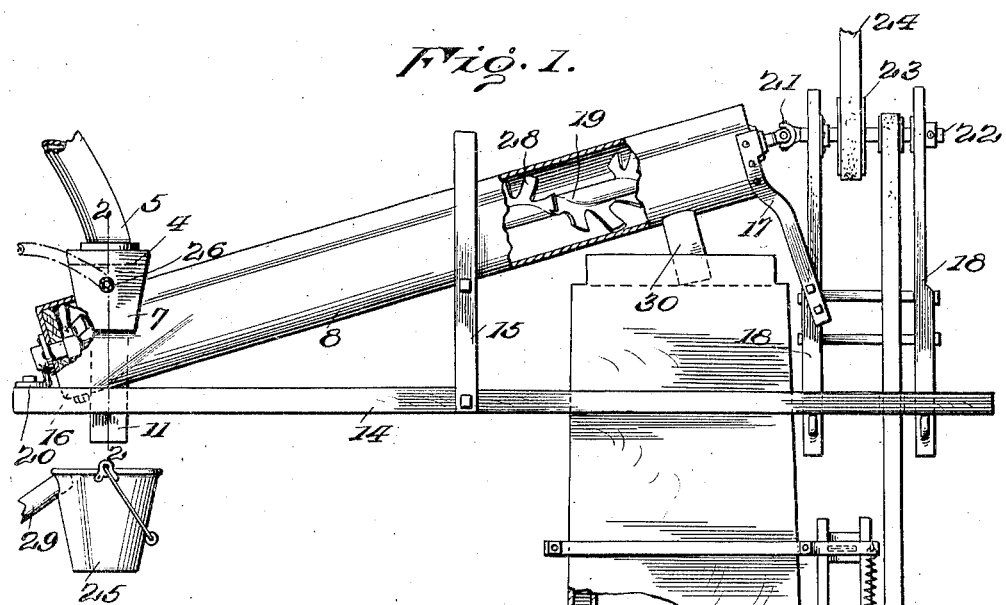
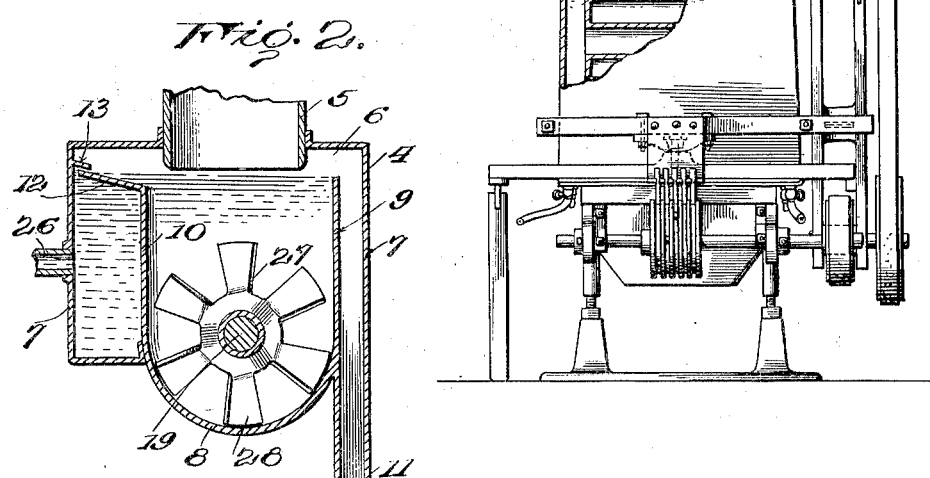
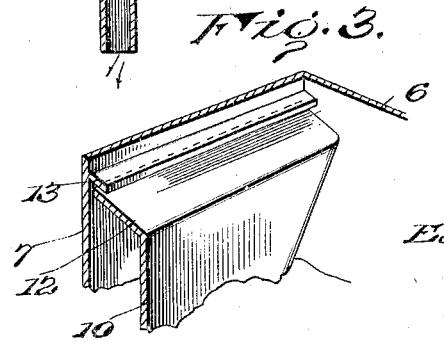
Inventor
Edward M. Warrenfeltz
by Lacey & Lacey,
Attorneys.

UNITED STATES PATENT OFFICE.

EDWARD M. WARRENFELTZ, OF FUNKSTOWN, MARYLAND, ASSIGNOR OF ONE-FOURTH TO LEON R. YOURTEE, OF HAGERSTOWN, MARYLAND, AND ONE-FOURTH TO CHARLES H. DENTLER, OF FUNKSTOWN, MARYLAND.

GRAIN-CLEANER.

1,360,335.  Specification of Letters Patent.  Patented Nov. 30, 1920.

Application filed June 23, 1919.  Serial No. 306,019.

*To all whom it may concern:*

Be it known that I, EDWARD M. WARRENFELTZ, citizen of the United States, residing at Funkstown, in the county of Washington and State of Maryland, have invented certain new and useful Improvements in Grain-Cleaners, of which the following is a specification.

This invention relates to methods and apparatus for the separation of grain, such as wheat and the like, from foreign matter, such as garlic, cockle and other screenings which are lighter than the grain.

My method consists in feeding the grain into a tank of water, causing the foreign matter to separate from the grain and to float on the surface of the water, and skimming the surface of the water in the tank by causing the film of water containing the foreign matter to discharge into a drain by overflowing.

An object is to separate grain from foreign matter by washing the grain and transferring the washed grain to a higher level over an inclined plane to cause the grain to be drained of its washing fluid during said transfer.

Another object is to remove foreign matter from grain and to transfer the grain in such a manner as to produce a complete separation of the grain and the foreign matter.

With the above and other objects in view my invention comprises the method and means hereinafter described, an embodiment whereof is illustrated in the accompanying drawings in connection with a drying device which forms the subject matter of an application of even date herewith.

In the said drawings:

Figure 1 is an elevation of my apparatus;

Fig. 2 is a section on the line 2—2 of Fig. 1, and

Fig. 3 is an enlarged sectional detail of the inlet through which water enters the separating chamber.

Referring more particularly to the drawing for a detail understanding of my invention, a casing or tank 4 open at the top is adapted to receive grain from a chute 5 and is provided with walls 6 having parallel edges and with walls 7 which are narrower at the bottom than at the top as shown. The tank is mounted transversely on a hollow cylinder 8 which is provided with an opening communicating with the tank and being connected therewith in such a manner as to make said connection water-tight. The tank is provided with a partition 9 merging into the cylinder and tangential thereto on the line of its communication with the interior of the tank and with a partition 10 similarly connected with the cylinder opposite the partition 9. The partition 9 is extended downwardly and outwardly forming in connection with the adjacent wall of the tank a drain 11. The outer wall of the tank adjacent the partition 10 is provided with a bottom joined onto the partition 10 on a line where said partition 10 merges into the wall of the cylinder. The partition 10 is bent along a line slightly below the level of the partition 9 and is thence extended along a rising plane 12 in the direction of the adjacent wall of the tank, terminating at some distance from the said wall upon which is a projection or lip 13 overlapping, for a short distance, the plane 12 and approximately parallel with and slightly above it. It will thus be seen that a space is provided between the lip and the inclined extension 12 of the partition 10 which space establishes communication between the compartments at the opposite sides of the partition. The cylinder 8 is inclined, as shown in Fig. 1, and is supported upon a base 14 by a pedestal or post 15 rising from the base at an intermediate point thereof, the lower end of the cylinder being carried directly by the base, as shown at 16, and the upper end being held by a bracket 17 upon a frame 18. A shaft 19 extends longitudinally through the cylinder, the lower end of the shaft being journaled in a bracket 20 and its upper end being connected by a universal joint 21 with a shaft 22 supported by bearings on the frame 18. The shaft 22 is adapted to be driven by a pulley 23 around which is trained a belt 24. A receptacle 25 is arranged to receive the discharge from the drain 11. The tank 4 is provided with an opening adapted for connection with a water supply pipe 26. The shaft 19 is provided throughout its length with a conveyer 27 winding helically about the full length of the shaft and provided with teeth or paddles 28. The receptacle 25 is preferably provided with an overflow discharge 29.

From the above description, my method for cleaning grain will be readily understood to be as follows: Water is admitted through the inlet 26 to the compartment or chamber formed by the walls of the tank with the partition 10 and will flow through the opening between the plane 12 and the lip 13. The water will accumulate in the tank between the partitions 9 and 10 until it reaches the level of the top of the partition 9, when the supply may be cut down until the entering water forms a thin film or sheet which will flow across or skim the surface of the water. The drain to be washed is fed through the chute into the tank and tends to gravitate to the bottom of the tank but, during its descent, the foreign matter is washed from the grain, which foreign matter being lighter than than the grain, rises to the surface of the water where it will be picked up by the thin film of the water from the opening between the plane 12 and the lip 13. The floating matter, obviously, will be carried over the top of the partition 9 and drained into the receptacle 25. The washed grain will be engaged by the conveyer and forced through the cylinder toward the upper end thereof, being drained of the greater portion of the water during its passage, and it may be here noted that the greater portion of the cylinder is above the level of the tank. Near the upper end of the cylinder is an outlet spout 30 through which the washed grain passes into a drier 31 to be relieved of all remaining moisture. The action of the conveyer, of course, creates some agitation of the grain and the water and prevents packing of the grain at the bottom of the tank and assists in the separation but the separation of the wheat from the garlic, oats, and other foreign matter is due primarily to the differences in the specific gravities of the different ingredients of the mass and the consequent floating of the lighter particles. The receptacle 25 is preferably a bucket from which the lighter particles may be floated. Sometimes, some grains of wheat will escape through the drain 11 and this wheat may be saved by using a bucket in which it may settle, as shown.

Having thus described the invention, what is claimed as new is:

1. The method of separating grain from foreign matter consisting in establishing a still body of wash water, feeding the grain containing foreign matter on to the surface of said body of water whereby the grain gravitates to the bottom, and maintaining a continuously moving film across the surface of said wash water by feeding additional water thereto at an obtuse angle to the surface of the body of wash water whereby the theoretically advancing edge presented by the incoming water carries before it the film already established on the body of wash water without appreciably disturbing the surface tension.

2. The method of separating grain from foreign matter consisting in establishing a still body of wash water, feeding the grain containing foreign matter on to the surface of such body whereby the grain gravitates to the bottom, and maintaining a continuously moving film across the surface of said wash water by feeding additional water thereto along the lineal edge of such surface and at an obtuse angle thereto whereby the theoretically advancing edge presented by the incoming water carries before it the film already established on the body of wash water without appreciably disturbing the surface tension thereof.

3. The method of separating grain from foreign matter consisting in establishing a still body of wash water, feeding the grain containing foreign matter on to the surface of such body whereby the grain gravitates to the bottom, maintaining a continuously moving film across the surface of said wash water by feeding additional water thereto along the lineal edge of such surface and at an obtuse angle thereto whereby the theoretically advancing edge presented by the incoming water carries before it the film already established on the body of wash water without appreciably disturbing the surface tension thereof, and withdrawing the washed grain wholly beneath the surface of the still body of wash water.

4. The combination of a washer adapted to separate grain from foreign matter, a chamber within and at one side of said washer, means for supplying water to said chamber and thence to said washer, means for holding the water in the washer at a fixed level below the level of the water in the chamber, and means for causing the water issuing from the chamber to enter the wash water at an obtuse angle to the surface thereof whereby it flows in a film over the surface of the water in the washer.

5. The combination with a tank, of a cylinder connected with the bottom of the tank, a base provided with a seat for one end of said cylinder, means to support the cylinder in an inclined plane with the greater portion thereof above the level of the water in the tank, a shaft mounted on the axis of said cylinder, a conveyer provided with paddles mounted on the shaft, means for feeding water and grain into the tank, and means for draining water from the tank, said conveyer being adapted to force the grain from the tank upwardly through the cylinder whereby to drain the grain.

6. The combination of a tank, partitions in the tank adjacent opposite sides thereof and terminating short of the top thereof, an outlet drain at one side of the tank, a water inlet at the opposite side thereof, an inclined plane extending upwardly and outwardly from the upper edge of the partition nearer the inlet, to feed the incoming water across the surface of the water in the tank without appreciably disturbing the surface tension thereof, said inclined plane terminating in spaced relation to the adjacent side of the tank and above the plane of the upper edge of the more remote partition, a lip on the wall of the tank overlapping and slightly spaced from said inclined plane, an elevator leading from the top of the tank between the partitions, and a chute arranged to discharge through the top of the tank between the partitions.

In testimony whereof I affix my signature.

EDWARD M. WARRENFELTZ. [L. S.]